June 1, 1954   W. A. LUTHER, JR   2,679,683
POROUS METAL ELEMENT
Filed Dec. 15, 1949
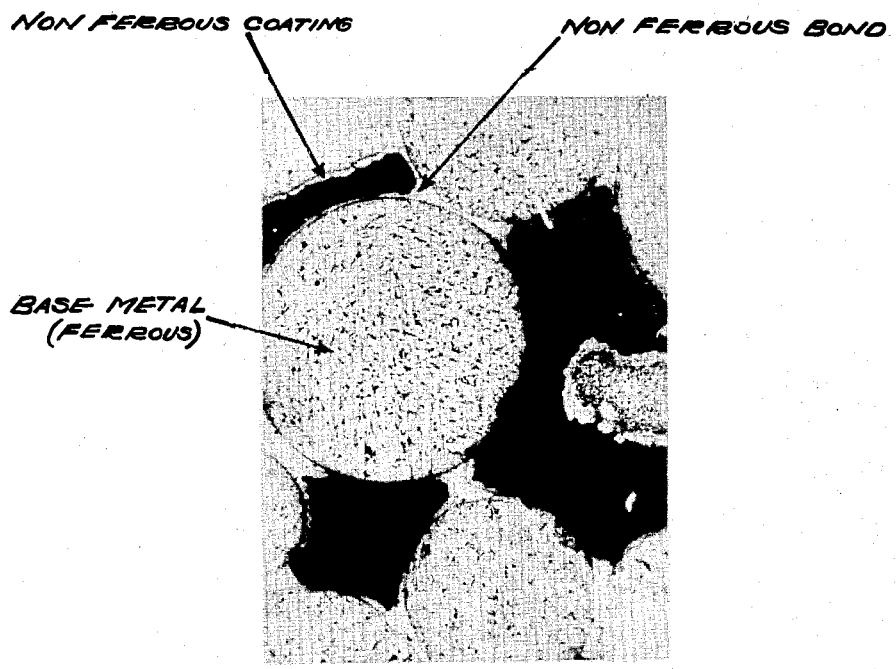
Inventor
William A. Luther Jr.
By Willite, Hardman & Behr
Attorneys Patented June 1, 1954

2,679,683

UNITED STATES PATENT OFFICE 2,679,683

POROUS METAL ELEMENT

William A. Luther, Jr., Dayton, Ohio, assignor to General Motors Corporation, Detroit, Mich., a corporation of Delaware Application December 15, 1949, Serial No. 133,065

2 Claims. (Cl. 29—182.2)

This invention relates to porous elements and is particularly concerned with porous ferrous elements having surface characteristics different than the main portion of the metal used.

The basic object of the invention is to provide a ferrous porous element for use as a filter, porous membrane, or the like, wherein the effective contact surface of the element consists of a non-ferrous metal.

Another object of the invention is to provide an inexpensive porous element made from strong ferrous material which includes a complete covering over the ferrous material of a non-ferrous metal.

A still further object of the invention is to provide a porous element having iron as a base material wherein each particle of iron is coated with bronze or another alloy, which bronze acts as a bonding medium and a surfacing material.

Further objects and advantages of the present invention will be apparent from the following description, reference being had to the accompanying drawing wherein:

Fig. 1 shows a photomicrograph on a greatly enlarged scale of a portion of porous element showing the complete covering over of the ferrous particles of a non-ferrous metal which acts as a bonding agent.

In the manufacture of porous elements, for example, elements to be used as filters and the like as disclosed in the Davis Patent No. 2,157,596 and Koehring Patent No. 2,198,702, it has been past practice to utilize two metals which are alloyable one with the other and which when sintered together in a substantially loose, non-compacted condition to form a homogeneous porous mass. Thus porous elements made from mixtures of copper-tin, copper-nickel, copper-silver, etc., present an alloy mass which is highly suitable in filtering operations and in other applications where porous elements are required. Materials of this type are costly and I have found that similar articles can be made from considerably cheaper materials, which articles have the same surface characteristics as the more expensive non-ferrous alloy articles.

In one form of my invention it is directed to the use of an iron or steel shot as a base material to form the major portion of the mass of the article. This shot is coated by plating as hereinafter defined, first with a layer of copper and then with a layer of tin wherein the copper varies from 8 to 22% of the total weight of the particle and the tin from 1.5 to 4% thereof. Iron or steel shot so electroplated are then molded to the desired shapes with substantially no compression and are sintered at temperatures ranging from 1550° F. to 1700° F., for from 10 to 30 minutes, depending on the specific copper-tin quantities used. If the tin is at the high end of the range and copper at the low, the lower sintering temperatures are preferred, whereas if the copper is at the high end of the range, the higher sintering temperatures are advisable, etc. In any case, suitable sintering will occur throughout the temperatures noted when sintering is carried out for a suitable time.

During the sintering operation, the tin melts and immediately alloys with the copper to form a bronze which protectively coats the ferrous particles and simultaneously due to surface tension forms fillets or bonds between adjacent particles whereupon, after cooling, the coated ferrous particles are firmly bonded together into a porous mass.

Instead of a bronze layer, the ferrous base particles may be plated first with nickel and then with copper in desired alloying proportions (i. e. copper from 10–60% and nickel from 90–40%). Sintering temperatures of from 2000 to 2150° F., will yield a copper-nickel alloy covering and bond. Sintering is, of course, carried out in a non-oxidizing atmosphere for from 10 to 30 minutes.

Another embodiment comprehends the use of copper and silver plates in desired ratios (copper 10–30% and silver from 90–70%) on ferrous particles. Sintering temperatures may vary from 1800 to 1950° F., for from 10 to 30 minutes in a suitable atmosphere.

In all cases, the lower melting point metal is preferably maintained adjacent the external surface of the particle and quantities ranging from 9.5 to 26% by weight of the base metal may be used. Higher percentages cause a loss in cost advantage.

I have found that the carbon content of the ferrous metal when steel shot is used, should be .40% or below since carbon above this figure creates plating difficulties which are costly to overcome.

The metal powder (ferrous) is plated with the various plates by the barrel method when electroplating is used and after plating the coated powder is suitably dried. Plating may be done by methods other than electrodeposition. Vapor deposition, chemical displacement or mechanical attachment by means of a binder may all be used to plate the base particles with the coating metals.

It is manifest in the foregoing that I have provided a porous element of an entirely new material which consists of a major portion by weight of a relatively inexpensive material and a minor portion by weight of a coating or covering material which has the desired chemical and metallurgical characteristics for fabrication and use of the porous metal element whereby inexpensive elements may be used in applications where heretofore a considerably more expensive element was necessarily employed.

While the embodiment of the present invention as herein disclosed, constitutes a preferred form, it is to be understood that other forms might be adopted.

What is claimed is as follows:

1. A highly porous metal element of the class described, consisting of a porous cupreous alloy skeleton having copper as its major component and including completely separated ferrous particles interspersed through said skeleton, each of said ferrous particles being completely coated with and fully separated by said cupreous alloy wherein said ferrous particles make up to from 84 to 90.5% by weight of the element, said element being formed from non-compacted ferrous particles wherein each particle includes an inner layer of copper and an outer layer of a lower melting point metal readily alloyable with copper and sintered at a temperature above the melting point of the readily alloyable metal and below the melting point of copper for forming the cupreous alloy in situ during the sintering operation.

2. A highly porous metal element of the class described, consisting of a porous bronze alloy skeleton having copper in quantities of from 8 to 22% and tin in quantities of from 1½ to 4% by weight and including completely separate ferrous particles interspersed therethrough, each of said ferrous particles being completely coated with and fully separated by said bronze wherein said ferrous particles make up the remainder of the element by weight, said element being formed from non-compacted ferrous particles wherein each particle is coated with an inner layer of copper and an outer layer of tin and wherein the non-compacted particles are sintered at a temperature above the melting point of tin and below the melting point of copper for forming the bronze alloy in situ during the sintering operation.

References Cited in the file of this patent

UNITED STATES PATENTS

| Number | Name | Date |
| --- | --- | --- |
| 1,882,972 | Schlecht et al. | Oct. 18, 1932 |
| 1,949,623 | Quarnstrom | Mar. 6, 1934 |
| 1,974,173 | Calkins | Sept. 18, 1934 |
| 1,986,197 | Harshaw | Jan. 1, 1935 |
| 1,992,548 | Short | Feb. 26, 1935 |
| 2,027,532 | Hardy | Jan. 14, 1936 |
| 2,042,635 | Schellens | June 2, 1936 |
| 2,097,671 | Koehring | Nov. 2, 1937 |
| 2,157,596 | Davis | May 9, 1939 |
| 2,198,702 | Koehring | Apr. 30, 1940 |
| 2,220,641 | Davis | Nov. 5, 1940 |
| 2,251,410 | Koehring | Aug. 5, 1941 |
| 2,273,589 | Olt | Feb. 17, 1942 |
| 2,358,326 | Hensel et al. | Sept. 19, 1944 |
| 2,363,337 | Kelly | Nov. 21, 1944 |
| 2,409,295 | Marvin et al. | Oct. 15, 1946 |
| 2,456,779 | Goetzel | Dec. 21, 1948 |
| 2,483,075 | Truesdale | Sept. 27, 1949 |